United States Patent [19]

Iwamura

[11] Patent Number: 5,529,107
[45] Date of Patent: Jun. 25, 1996

[54] PNEUMATIC RADIAL TIRE WITH LOW TWIST ORGANIC CARCASS CORDS

[75] Inventor: Wako Iwamura, Kobe, Japan

[73] Assignee: Sumitomo Rubber Industries, Ltd., Japan

[21] Appl. No.: 337,028

[22] Filed: Nov. 7, 1994

Related U.S. Application Data

[62] Division of Ser. No. 162,901, Dec. 8, 1993, abandoned, which is a continuation of Ser. No. 977,797, Nov. 17, 1992, abandoned.

[30] Foreign Application Priority Data

Nov. 26, 1991 [JP] Japan ..................... 3-337661

[51] Int. Cl.$^6$ ..................... B60C 9/04; B60C 9/08; B60C 15/00; B60C 15/06
[52] U.S. Cl. ..................... 152/542; 152/539; 152/546; 152/553; 152/554; 152/556
[58] Field of Search ..................... 152/539, 542–543, 152/546, 552–556, 557, 560

[56] References Cited

U.S. PATENT DOCUMENTS

| | | | |
|---|---|---|---|
| 2,273,200 | 2/1942 | Hoff | 152/556 X |
| 2,895,525 | 7/1959 | Lugli | 152/560 X |
| 3,245,454 | 4/1966 | Lewis | 152/554 |
| 3,722,567 | 3/1973 | Delobelle | 152/553 |
| 3,888,292 | 6/1975 | Menell et al. | 152/542 |
| 4,024,901 | 5/1977 | Poqué | 152/553 X |
| 4,265,292 | 5/1981 | Inoue | 152/553 X |
| 4,389,839 | 6/1983 | vander Werff | 152/556 X |
| 4,541,467 | 9/1985 | Nakamura et al. | 152/554 X |
| 4,627,479 | 12/1986 | Shurman et al. | 152/556 X |
| 4,630,663 | 12/1986 | Bell et al. | 152/556 X |
| 4,716,950 | 1/1988 | Morikawa et al. | 152/560 X |
| 4,972,893 | 11/1990 | Komai et al. | 152/553 X |
| 5,007,472 | 4/1991 | Kuze et al. | 152/553 X |
| 5,111,865 | 5/1992 | Shinmura | 152/554 X |
| 5,117,886 | 6/1992 | Tokutake | 152/546 X |

FOREIGN PATENT DOCUMENTS

| | | |
|---|---|---|
| 0034378 | 8/1981 | European Pat. Off. . |
| 0238679 | 9/1987 | European Pat. Off. . |
| 0296093 | 12/1988 | European Pat. Off. . |
| 0329593 | 8/1989 | European Pat. Off. . |
| 58-43802 | 3/1983 | Japan ..................... 152/556 |
| 59-102604 | 6/1984 | Japan ..................... 152/546 |
| 992341 | 5/1965 | United Kingdom ..................... 152/553 |

*Primary Examiner*—Adrienne C. Johnstone

[57] ABSTRACT

A pneumatic radial tire having a tread portion, a pair of axially spaced bead portions with a bead core, a pair of sidewall portions, a carcass having a carcass ply of radially arranged cords extending between the bead portions and turned up around the bead cores to form a main portion and two turned up portions, and a bead apex disposed between the main portion and each turned up portion in each bead portion and extending radially outwardly from the bead core, the carcass cords made of twisted organic fiber filaments, the twist number being more than 5 and less than 30 turn/10 cm.

5 Claims, 5 Drawing Sheets

TEST TIRE

TEST TIRE

TEST TIRE

PNEUMATIC RADIAL TIRE WITH LOW TWIST ORGANIC CARCASS CORDS

This application is a divisional of application Ser. No. 08/162,901, (now abandoned) filed on Dec. 8, 1993, which is a continuation of Ser. No. 07/977,797, (now abandoned) filed Nov. 17, 1992, the entire contents of which are hereby incorporated by reference.

BACKGROUND OF THE INVENTION

The present invention relates to a pneumatic tire, in which a carcass ply is made of low twist organic cords so as to achieve a tire weight reduction or a carcass strength improvement.

In a high performance tire having an aspect ratio of not more than 80%, organic fiber cords, e.g. polyester, rayon and nylon are generally used in the carcass. In such a carcass cord, in order to provide a fatigue resistance to a compressive stress and thereby to prevent carcass cords, which are located axially outside a bead apex, from being damaged during running under a heavy load condition, the cord twist has been set at a larger value for example 40 turns/10 cm or more.

Such a high twist cord is however poor in tensile strength, and therefore is not suitable for a high performance tire used under very high pressure and very high speed conditions.

Accordingly, in order to obtain the desired tensile strength for the carcass, the diameter of the carcass cord, the cord count of a carcass ply, and/or the number of carcass plies have been increased. As a result, tire weight is undesirably increased, deteriorating the tire's running performance. On the other hand, if such parameters are decreased to reduce tire weight, the carcass strength is reduced which also deteriorates the tire's running performance.

It is therefore, an object of the present invention to provide a pneumatic radial tire, in which the above-mentioned problems are solved.

SUMMARY OF THE INVENTION

According to one aspect of the present invention, a pneumatic radial tire comprises a tread portion, a pair of axially spaced bead portions with a bead core, a pair of sidewall portions, a carcass having a carcass ply of radially arranged cords extending between the bead portions and turned up around the bead cores to form a main portion and two turned up portions, and a bead apex disposed between the main portion and each turned up portion in each bead portion and extending radially outwardly from the bead core, the carcass cords made of twisted organic fiber filaments, wherein the twist number is more than 5 and less than 30 turn/10 cm.

Therefore, the bending rigidity and tensile strength of the carcass cord are increased. Accordingly, the required carcass strength can be obtained, even if the carcass cord diameter, cord count and ply number are decreased in comparison with conventional cords. Thus, tire weight may be reduced and tire rigidity improved.

BRIEF DESCRIPTION OF THE DRAWINGS

Embodiments of the present invention will now be described in detail in conjunction with the accompanying drawings, in which.

DETAILED DESCRIPTION OF THE INVENTION

Figure 1:
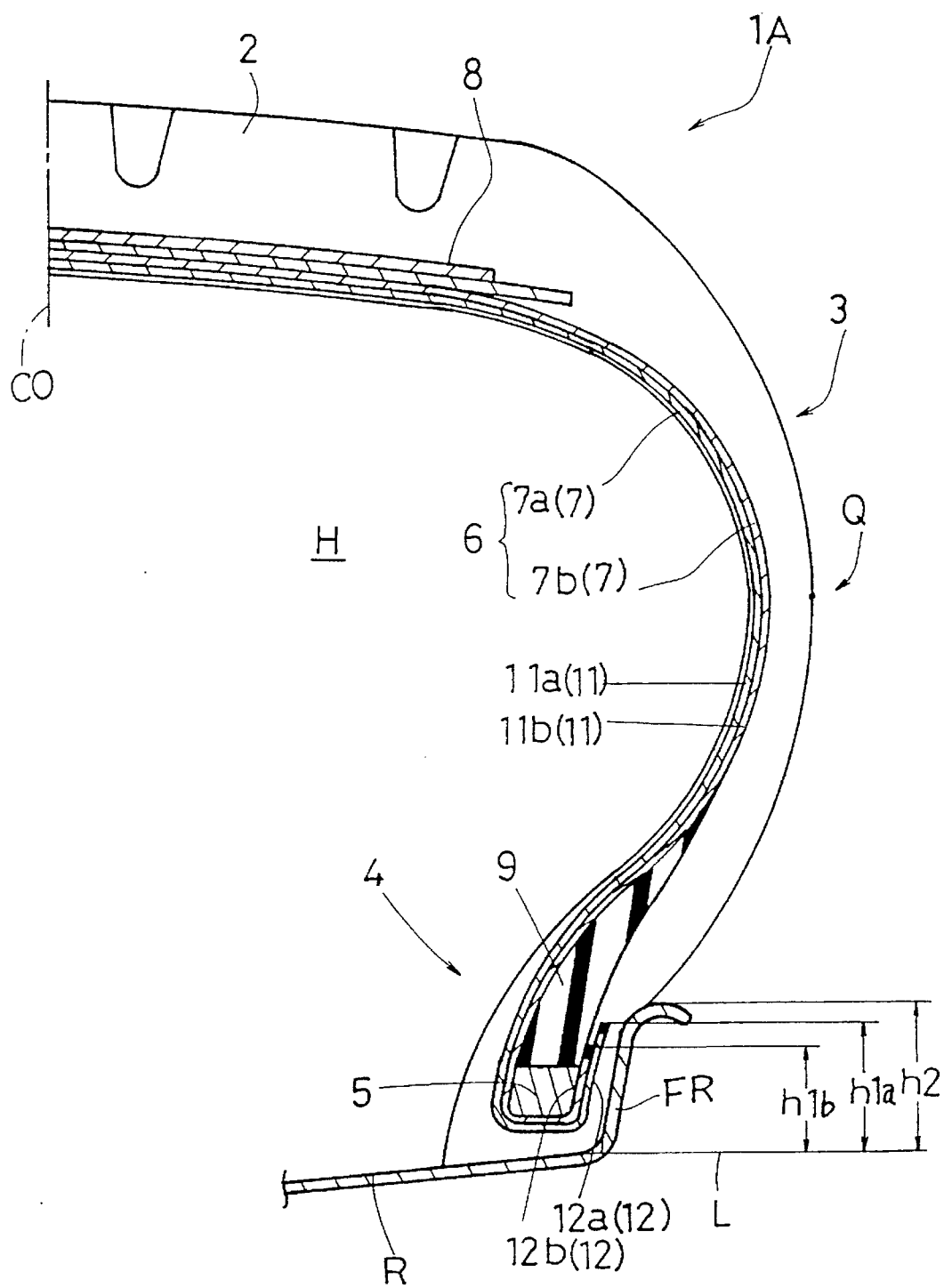
FIG. 1 is a cross sectional view of a pneumatic radial tire according to the present invention.
Figure 4:
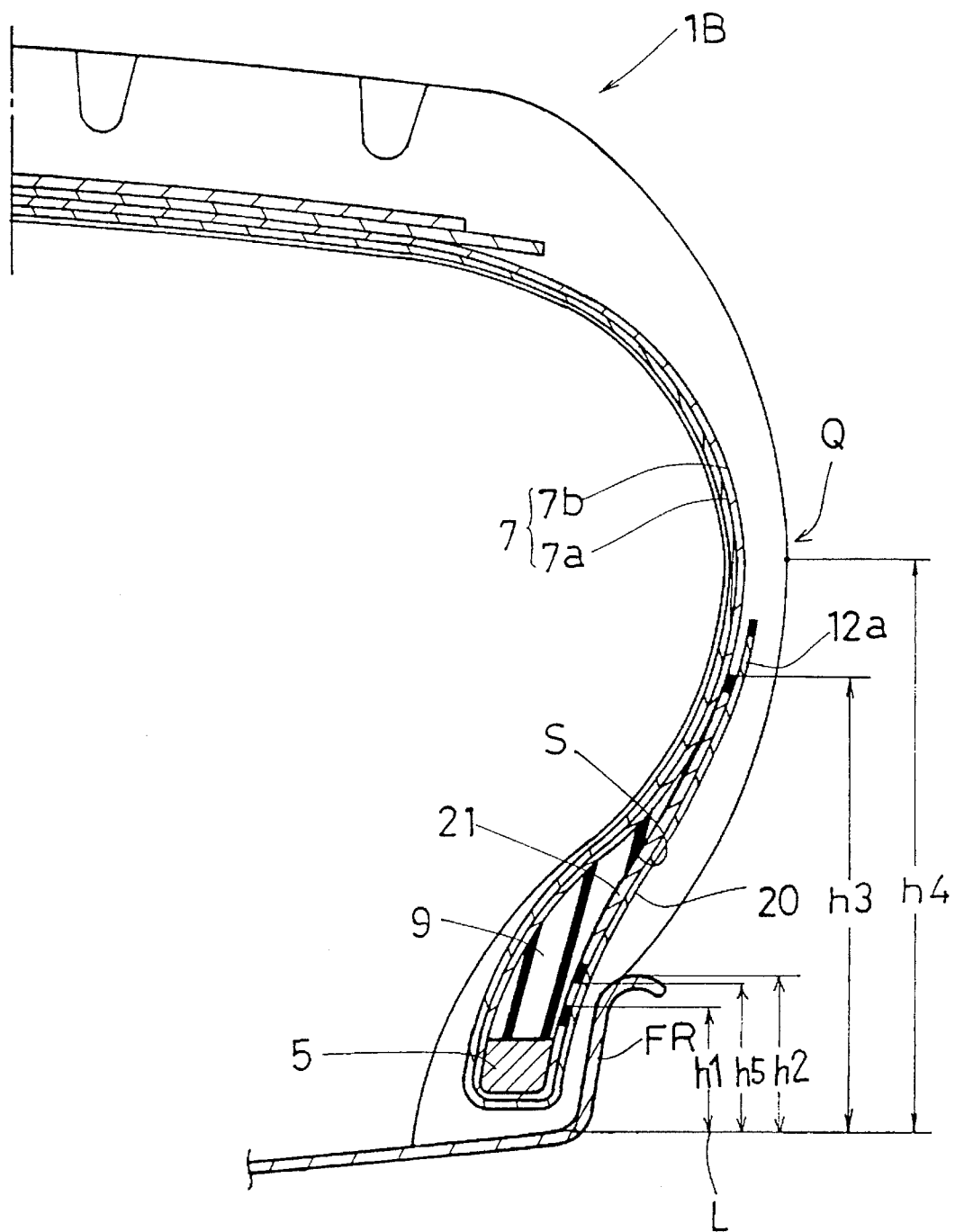
FIG. 4 is a cross sectional view of a pneumatic radial tire according to the present invention.

In FIGS. 1 and 4, pneumatic radial tire 1A, 1B comprises a tread portion 2, a pair of axially spaced bead portions 4, a pair of sidewall portions 3 extending between the tread edges and the bead portions, a pair of bead cores 5 with one disposed in each of the bead portions 4, a carcass 6 extending between the bead portions 4, a belt 8 disposed radially outside the carcass 6 and inside a rubber tread.

The tire has an aspect ratio of smaller than 70%, which is defined as the ratio of the tire section height to the tire section width.

In FIGS. 1 and 4, the tire is mounted on its regular rim R and inflated to its regular inner pressure, but not loaded. Here, the regular rim R is a rim officially approved for the tire by JATMA (Japan), TRA (U.S.A.) and ETRTO (Europe), and the regular inner pressure and a regular load are the maximum air pressure and the maximum tire load for the tire officially specified in Air-pressure/Maximum-load Table by the same associations.

The carcass 6 comprises at least one ply 7 made of carcass cords 10 laid at an angle of 85 to 90 degrees with respect to the tire equator CO and turned up around the bead cores 5 to form a main portion 11 extending between the bead portions 4 and a pair of turned up portions 12.

Figure 2:
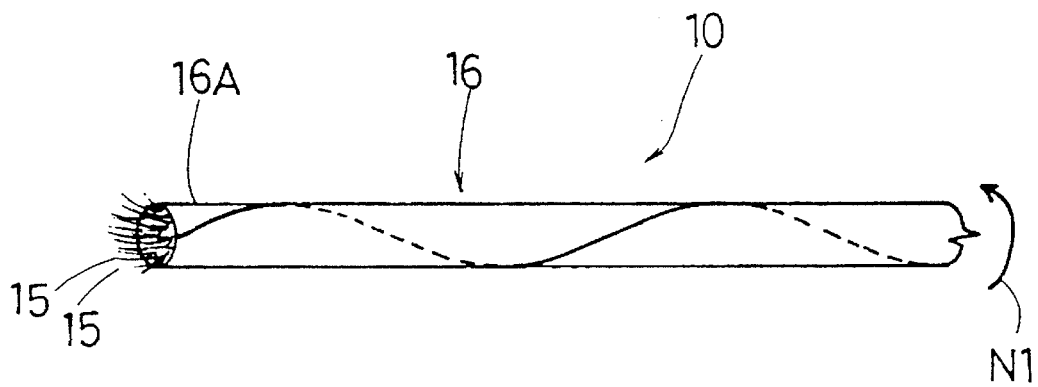
FIG. 2 is a schematic perspective view of an example of the carcass cord.

FIG. 2 shows an example of the carcass cord 10, in which the carcass cord 10 comprises a large number of strands 16 twisted together. Each strand 16 in this example is an organic fiber filament 15, e.g. polyester, rayon, nylon and the like.

The cord twist N thereof is more than 5 and less than 30 per 10 cm, which is greatly decreased in comparison with a conventional carcass cord. Accordingly, the cord tensile strength increases in comparison with a conventional cord with the same diameter and the same material, and the tire rigidity can be improved, and a carcass weight reduction can be achieved.

If the cord twist N is not more than 5, the extensibility of the carcass cord 10 is excessively lowered, and the belt elongation during tire vulcanization becomes small. As a result, tire molding accuracy and running stability are lost.

On the other hand, if the cord twist N is not less than 30, the cord does not exhibit an effective improvement in bending rigidity, tensile strength, and it is difficult to achieve a tire weight reduction. Preferably, the cord twist N is 10 to 25.

Figure 3:
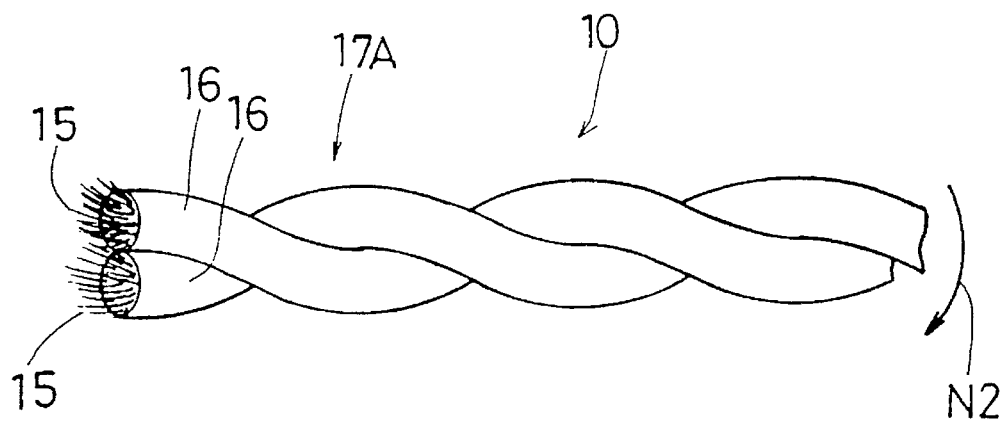
FIG. 3 is a schematic perspective view of another example of the carcass cord.

FIG. 3 shows another example of the carcass cord 10, in which the carcass cord 10 comprises a plurality, and this embodiment a small number (two) of strands 16 twisted together. Each strand 16 in this example is composed of a large number of organic fiber filaments 15, e.g. polyester, rayon, nylon and the like. The cord twist N2 and the strand twist N1 are more than 5 and less than 30 per 10 cm. Preferably, to decrease the energy loss of the cord, the cord twist direction is the same as the strand twist direction.

Each of the above-mentioned bead portions 4 is provided between the main portion 11 and each turned up portion 12 with a bead apex 9 extending to a taper radially outwardly from the bead core 5.

The bead apex 9 is made of a high elastic modulus rubber compound having a complex elastic modulus E of not less than 200 kgf/sq.cm and a JIS A hardness of 65 to 95 is used to increase the tire's lateral stiffness.

Further, the bead apex 9 has a radially extended outer edge terminated at a position radially outward of the radially outer edge of the rim flange FR and radially inwardly of the tire maximum width point Q at which the cross sectional width of the tire in the sidewall portions 3 becomes maximum.

Figure 6:
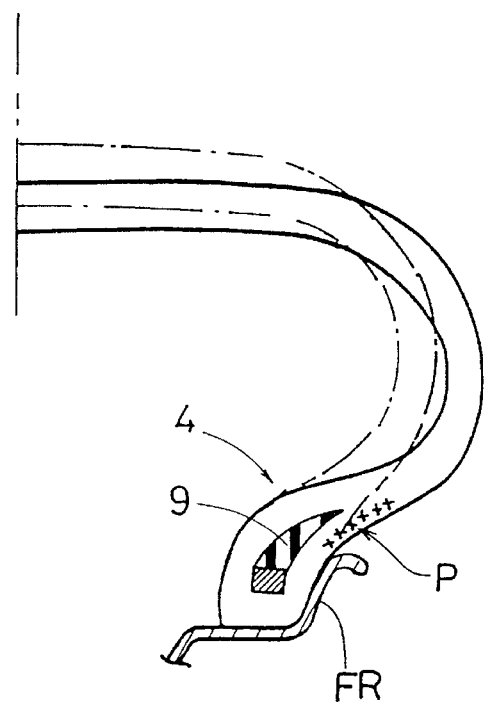
FIG. 6 is a diagram explaining deformation of a tire.

In contrast, if the twist number is decreased, the resistance to compressive fatigue of the cord decreases. When a tire is deformed by its load, as shown in FIG. 6, the bead portion 4 is bent axially outwards, and a large compressive stress is produced in a region P axially outward of a bead apex 9 and radially outward of a rim flange FR. Therefore, if the carcass cords are disposed in such a region P, the carcass cords are repeatedly subjected to a compressive stress, that results in many of the carcass cords being broken.

In the first example tire 1A in FIG. 1, the carcass 7 is composed of an inner carcass ply 7a and an outer carcass ply 7b, both turned up around the bead cores from axially inside to outside of the tire. The inner carcass ply 7a has a main portion 11a and a pair of turned up portions 12a, and the outer carcass ply 7b has a main portion 11b and a pair of turned up portions 12b. The radial heights h1a, h1b of the radially outer edges of the turned up portions 12a, 12b measured from the bead base line L are set to be smaller than the radial height h2 of the radially outer edge of the rim flange FR measured from the bead base line L. Thereby, the carcass cords 10 are freed from the above described compressive stress, thereby improving tire durability.

In the second example tire 1B in FIG. 4, the carcass 7 is composed of an inner carcass ply 7a and an outer carcass ply 7b, both turned up around the bead cores from axially inside to outside of the tire. The inner carcass ply 7a has a main portion 11a and a pair of turned up portions 12a, and the outer carcass ply 7b has a main portion 11b and a pair of turned up portions 12b.

Each of the turned up portions 12a of one of the carcass plies 7a and 7b extends radially outwardly over the radially extending outer edge of the bead apex 9 along the axially extending outer surface of the bead apex 9 so as to completely cover the axially extending outer surface S of the bead apex 9.

A reinforcing cord layer 21 is disposed between the axially extending outer surface S of the bead apex 9 and the adjacent carcass ply (in this example, turned up portion 12a) to prevent compressive stress on the carcass cords therein.

Figure 5:
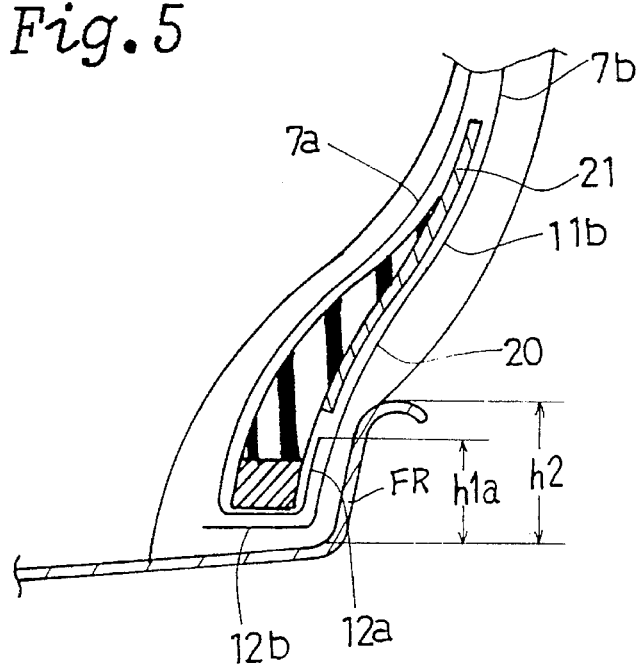
FIG. 5 is a cross sectional view of a bead portion of a pneumatic tire according to the present invention.

FIG. 5 shows a third example of the carcass 7, wherein the carcass 7 is composed of an inner carcass ply 7a and an outer carcass ply 7b. The inner carcass ply 7a is turned up around the bead cores from axially inside to outside of the tire to have a main portion 11a and a pair of turned up portions 12a. The radial height h1a of the turned up portion 12a is smaller than the radial height h2 of the rim flange FR. The outer carcass ply 7b is turned up around the bead cores from axially outside to inside of tire having a main portion 11b and a pair of turned up portions 12b. The main portion 11b extends along and adjacently to the axially extending outer surface S of the bead apex 9 to completely cover the turned up portion 12a.

A reinforcing cord layer 21 is disposed between the axially outer surface S and the adjacent carcass ply (in this example, main portion 11b) to prevent compressive stress on the carcass cords therein.

The reinforcing cord layer 21 in FIGS. 4 and 5 is composed of at least one ply of reinforcing cords disposed adjacently to the surface S of the bead apex 9. For the reinforcing cords, compressive resistant cords, e.g., steel cords and the like are used.

The reinforcing cords are laid at 40 to 90 degrees with respect to the tire circumferential direction to resist compressive stress in the radial direction of the tire. The reinforcing cord layer 21 extends radially outwardly from the bead portion over the radially extending outer edge of the bead apex 9. The radial height h3 of the radially extending outer edge thereof is in the range of 0.6 to 1.0 times the radial height h4 of the tire maximum width point Q, both measured from the bead base line L. The reinforcing cord layer 21 has a radially extending inner edge located at a radial height h5 substantially the same as or lower than the radially extended outer edge of the rim flange FR. In this example, h5 is slightly smaller than h2. By the provision of the reinforcing cord layer 21, the rigidity of the bead portion is increased, and the compressive stress to which the adjacent carcass cords are subjected are mitigated to improve bead durability.

Test tires of which the specification are given in Tables 1 and 2(a)–(b) were prepared and tested for durability, lateral spring constant, steering stability, and tire weight.

In the durability test, each test tire was mounted on its regular rim and inflated to its regular inner pressure and loaded by 200% of its regular, load, and then continuously run for 6000 km at a constant speed of 60 km/h.

The steering stability was evaluated by a driver into five ranks. (The larger the index, the better the steering stability.)

As described above, in the pneumatic radial tires of the present invention, the organic fiber filament cords of which the twist is more than 5 and less than 30 turn/10 cm are used in the carcass. Therefore, the bending rigidity and tensile strength are increased in comparison with the conventional cords, which helps to reduce the carcass weight and to improve running performances.

TABLE 1

Figure 7A:
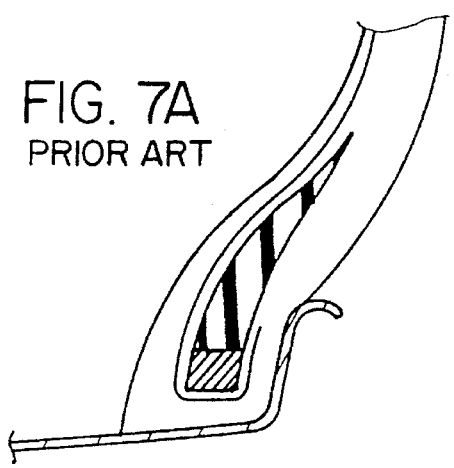
FIGS. 7A to 7E are cross sectional views showing carcass turned up structure of test tires and prior art tires.

|  | Ex. 1-1 | Ex. 1-2 | Ex. 1-3 | Ref. 1-0 | Ref. 1-1 | Ref. 1-2 | Ref. 1-3 |
| --- | --- | --- | --- | --- | --- | --- | --- |
| Tire Size | 205/65R15 | 155SR13 | 155SR13 | 205/65R15 | 155SR13 | 155SR13 | 155SR13 |
| Structure | FIG. 1 | FIG. 7A | FIG. 7A | FIG. 7A | FIG. 7A | FIG. 7A | FIG. 7A |
| Carcass |  |  |  |  |  |  |  |
| Turnup structure *1 | 2-OLTU | 1-OLTU | 1-OLTU | 2-OLTU | 1-OLTU | 1-OLTU | 1-OLTU |
| Carcass cord |  |  |  |  |  |  |  |
| Material | polyester | polyester | polyester | polyester | polyester | polyester | polyester |

TABLE 1-continued

|  | Ex. 1-1 | Ex. 1-2 | Ex. 1-3 | Ref. 1-0 | Ref. 1-1 | Ref. 1-2 | Ref. 1-3 |
|---|---|---|---|---|---|---|---|
| Structure | 1000d/2 | 1500d/2 | 1500d/1 | 1000d/2 | 1000d/2 | 1500d/1 | 1500d/2 |
| Cord twist (turn/10 cm) | 24 | 20 | 20 | 48 | 40 | 40 | 20 |
| Strand twist (turn/10 cm) | 24 | 20 | — | 48 | 40 | — | 20 |
| Angle (degree) | 90 | 90 | 90 | 90 | 90 | 90 | 90 |
| Durability | no damage | no damage | no damage | no damage | no damage | no damage | 4000 km *2 |
| Tire weight (kg) | 9.8 | 5.7 | 5.5 | 9.8 | 5.7 | 5.5 | 6.0 |
| Lateral spring constant (kg/mm) | 18.9 | 9.6 | 8.8 | 17.7 | 9.0 | 8.2 | 10.0 |
| Steering stability (index) | 3+ | 3 | 3− | 3 | 3− | 2.5+ | 3 |

*1
x-y LTU/HTU
x = number of carcass ply turned up from inside to outside
y = number of carcass ply turned up from outside to inside
LTU = Low turnup structure
HTU = High turnup structure
*2 Carcass was damaged after 4000 km run TABLE 2(a)

Figure 7B:
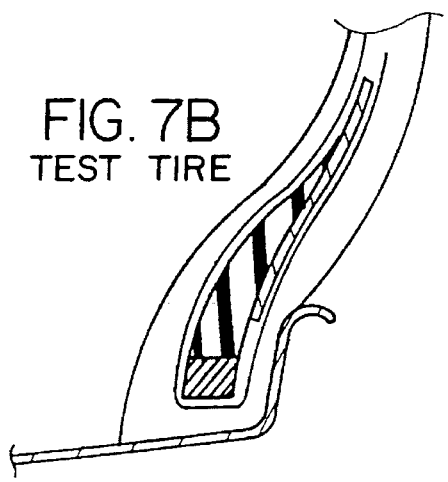

|  | Ex. 2-1 | Ex. 2-2 | Ex. 2-3 | Ex. 2-4 | Ex. 2-5 | Ref. 2-0 |
|---|---|---|---|---|---|---|
| Tire size | 225/50R16 | 225/50R16 | 225/50R16 | 185/60R14 | 185/60R14 | 225/50R16 |
| Structure | FIG. 4 | FIG. 4 | FIG. 5 | FIG. 7B | FIG. 7B | FIG. 4 |
| Carcass |  |  |  |  |  |  |
| Turnup structure *1 | 2-OHTU | 2-OHTU | 1-1LTU | 1-OHTU | 1-OHTU | 2-OHTU |
| Carcass cord |  |  |  |  |  |  |
| Material | polyester | polyester | polyester | polyester | polyester | polyester |
| Structure | 1000d/2 | 1000d/1 | 1000d/2 | 1500d/2 | 1500d/ | 1000d/2 |
| Cord twist (turn/10 cm) | 24 | 24 | 24 | 20 | 20 | 48 |
| Strand twist (turn/10 cm) | — | — | — | — | — | — |
| Durability | no damage | no damage | no damage | no damage | no damage | no damage |
| Tire weight (kg) | 11.3 | 10.9 | 11.1 | 8.1 | 7.9 | 11.3 |
| Lateral spring constant (kg/mm) | 23.6 | 22.3 | 23.3 | 12.7 | 11.7 | 22.5 |
| Steering stability (index) | 3+ | 3 | 3+ | 3+ | 3 | 3 |

TABLE 2(b)

Figure 7C:
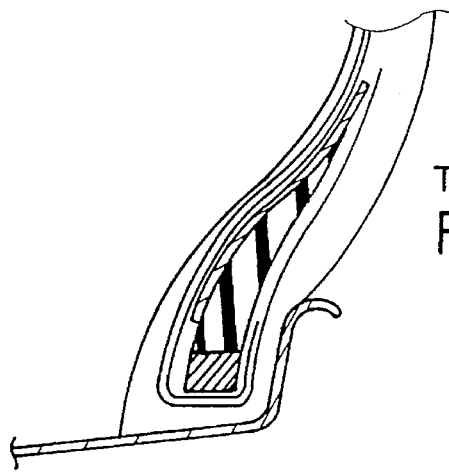
Figure 7D:
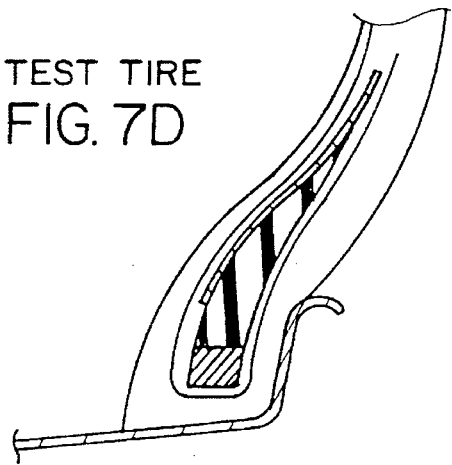
Figure 7E:
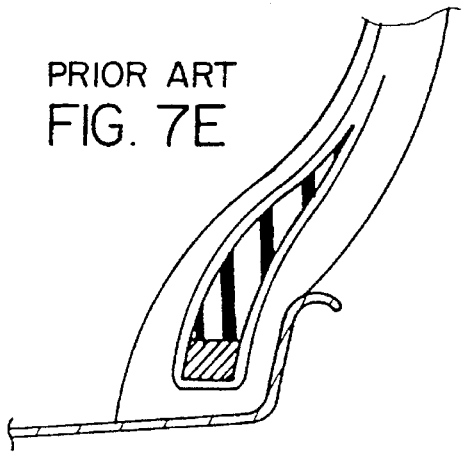

|  | Ref. 2-1 | Ref. 2-2 | Ref. 2-3 | Ref. 2-4 | Ref. 2-5 | Ref. 2-6 |
|---|---|---|---|---|---|---|
| Tire size | 225/50R16 | 225/50R16 | 185/60R14 | 185/60R14 | 185/60R14 | 185/60R14 |
| Structure | FIG. 5 | FIG. 7C | FIG. 7D | FIG. 7B | FIG. 7E | FIG. 7E |
| Carcass |  |  |  |  |  |  |
| Turnup structure *1 | 1-1LTU | 2-OHTU | 1-OHTU | 1-OHTU | 1-OHTU | 1-OHTU |
| Carcass cord |  |  |  |  |  |  |
| Material | polyester | polyester | polyester | polyester | polyester | polyester |
| Structure | 1000d/2 | 1000d/2 | 1500d/2 | 1500d/2 | 1500d/2 | 1500d/2 |
| Cord twist (turn/10 cm) | 48 | 24 | 20 | 40 | 20 | 40 |
| Strand twist (turn/10 cm) | 48 | 24 | 20 | 40 | 20 | 40 |
| Durability | no damage | damaged | damaged | no damage | damaged | no damage |
| Tire weight (kg) | 11.1 | 11.3 | 8.1 | 8.1 | 7.9 | 7.9 |
| Lateral spring constant (kg/m) | 22.1 | 23.7 | 12.7 | 12.0 | 10.9 | 10.3 |
| Steering stability (index) | 3 | 3+ | 3+ | 3 | 3− | 2.5+ |

*1
x-y LTU/HTU
x = number of carcass ply turned up from inside to outside
y = number of carcass ply turned up from outside to inside
LTU = Low turnup structure
HTU = High turnup structure

I claim:

1. A pneumatic radial tire to be mounted on a regular rim having a flange with a radial outer edge, said pneumatic radial tire, including:

a tread portion;

a pair of axially spaced bead portions each with a bead core, the bead portions having a bead base line;

a pair of sidewall portions;

a carcass of radially arranged carcass cords each composed of organic fiber filaments twisted together by a cord twist number in the range of more than 5 and less than 30 turns/10 cm, said carcass being composed of an inner carcass ply extending between the bead portions and turned up around each of the bead cores from axially inside to outside to form two turned up portions and one main portion therebetween, and an outer carcass ply extending between the bead portions and turned up around the bead cores from axially outside to inside to form a main portion extending between the bead portions, each of said two turned up portions of the inner carcass ply having a radially outer end located radially inward of the radial outer edge of the flange of the rim when the tire is mounted on the rim;

a bead apex disposed between the main portion and each turned up portion of the inner carcass ply in each bead portion and extending radially outwardly from the bead core; and a reinforcing cord layer disposed between an axial outer surface of each bead apex and the main portion of the outer carcass ply and extending radially outwardly from each bead portion, said reinforcing cord layer consisting of a ply of steel cords arranged in the range of from 40 to 90 degrees with respect to the tire's circumferential direction, said reinforcing cord layer having a radial outer end located at a radial height of from 0.6 to 1.0 times the radial height of the maximum tire width position both measured from the bead base line.

2. The pneumatic radial tire according to claim 1, wherein the reinforcing cord layer extends radially outward of the radially outer edge of each bead apex.

3. The pneumatic radial tire according to claim 1, wherein the reinforcing cord layer has a radial inner end located at a radial height substantially the same as or lower than the radially outer edge of the rim flange when the tire is mounted on the rim.

4. The pneumatic radial tire according to claim 1, wherein the reinforcing cord layer extends radially outward of the radially outer edge of each bead apex, and the reinforcing cord layer has a radial inner end located at a radial height substantially the same as or lower than the radially outer edge of the rim flange when the tire is mounted on the rim.

5. The pneumatic radial tire according to claim 1, 2, 3 or 4, wherein each of the carcass cords is composed of a plurality of strands twisted together by a cord twist number in the range of more than 5 and less than 30 turns/10 cm, each strand being composed of a large number of organic fiber filaments twisted together by a strand twist number in the range of more than 5 and less than 30 turns/10 cm.

* * * * *